UNITED STATES PATENT OFFICE.

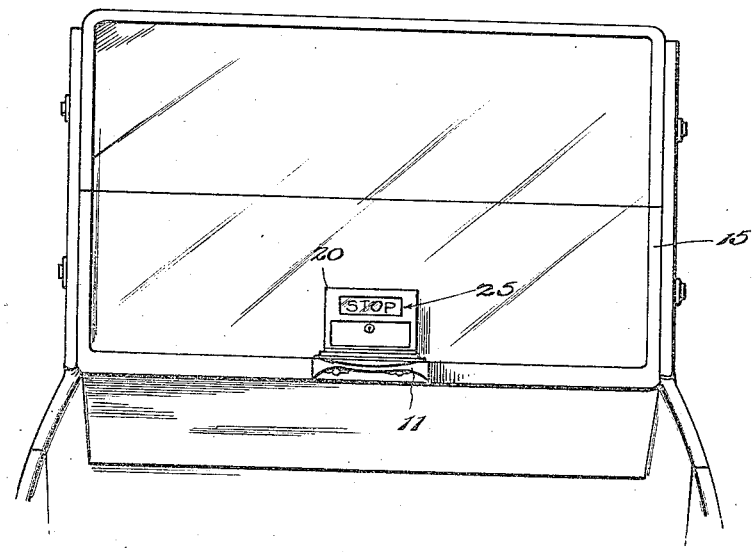
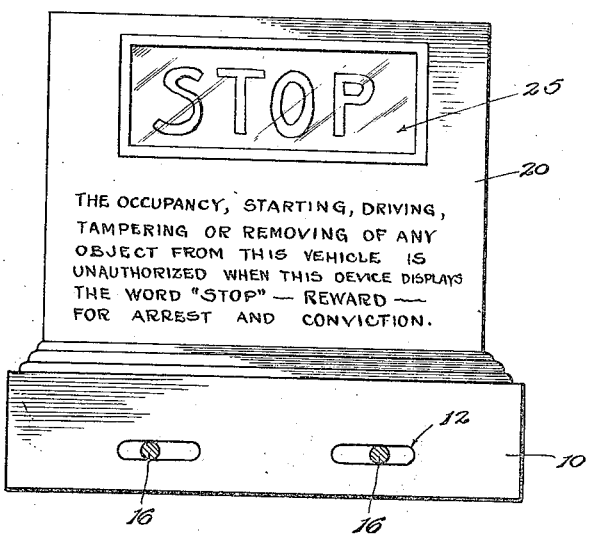
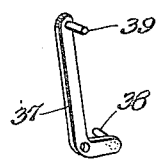
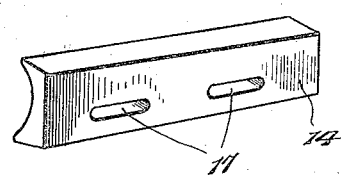

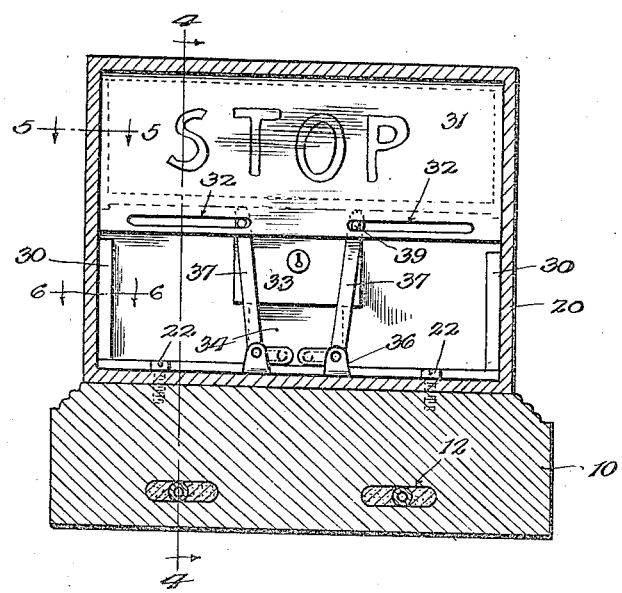
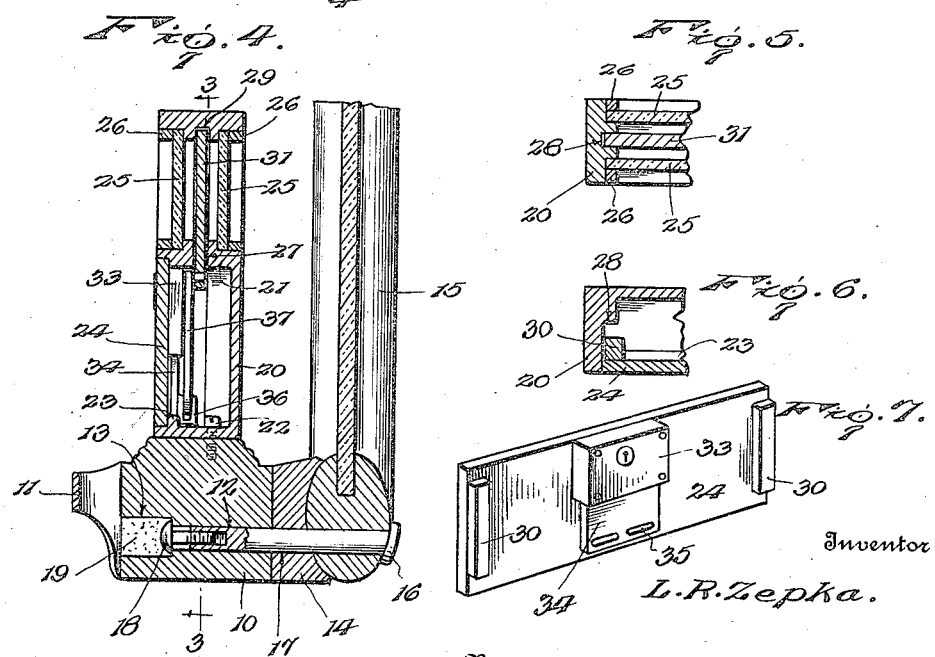

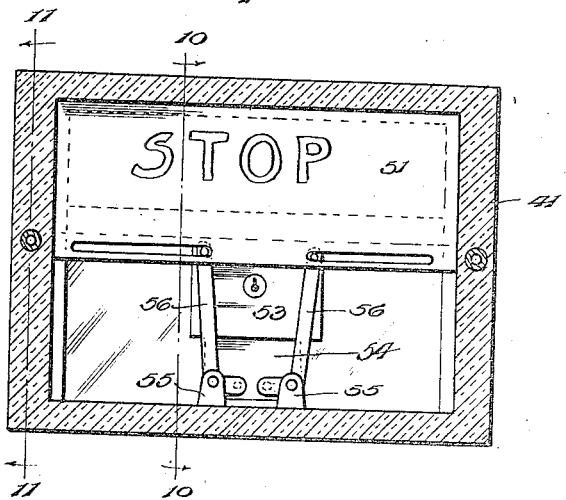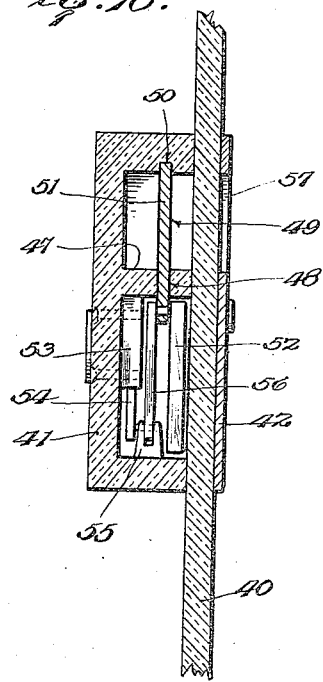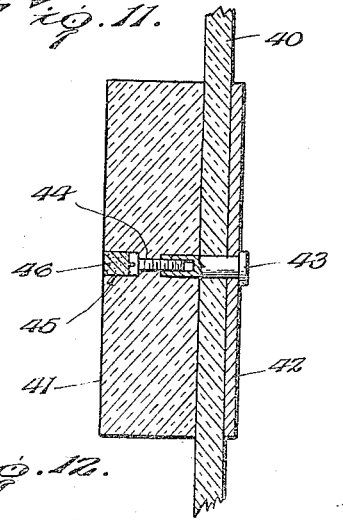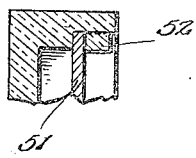

LUDWIG R. ZEPKA, OF CLEVELAND, OHIO.

THEFT SIGNAL FOR MOTOR VEHICLES.

1,422,404.   Specification of Letters Patent.   Patented July 11, 1922.

Application filed September 10, 1921. Serial No. 499,592.

*To all whom it may concern:*

Be it known that I, LUDWIG R. ZEPKA, citizen of the United States, residing at Cleveland, in the county of Cuyahoga and State of Ohio, have invented certain new and useful Improvements in Theft Signals for Motor Vehicles, of which the following is a specification.

This invention relates to an improved theft signal for motor vehicles and has as one of its principal objects to provide a neat and attractive device of this character which may be attached to a vehicle wind shield for displaying a warning signal when the vehicle is left standing.

A further object of the invention is to provide a device employing a disappearing signal plate and wherein an efficient mechanism will be provided for elevating the plate to display position or for lowering the plate out of sight.

And the invention has as a still further object to provide a device embodying a lock for securing the signal plate in display position and wherein possibility of tampering with the actuating mechanism for the plate will be reduced to a minimum.

Other and incidental objects will appear hereinafter.

In the drawings:

Figure 1 is an elevation showing my improved signal in connection with the wind shield of a conventional motor vehicle, Figure 2 is a detail front elevation of the device, Figure 3 is a vertical section on the line 3—3 of Figure 4, looking in the direction of the arrows, Figure 4 is a sectional view on the line 4—4 of Figure 3, looking in the direction of the arrows, Figure 4ª is a perspective view showing the seating block employed, Figure 5 is a fragmentary section on the line 5—5 of Figure 3, looking in the direction of the arrows, Figure 6 is a fragmentary section on the line 6—6 of Figure 3, looking in the direction of the arrows, Figure 7 is a detail perspective view of the closure plate for the casing of the device, Figure 8 is a perspective view showing one of the bell crank levers employed for actuating the signal plate of the device, Figure 9 is a vertical sectional view showing a modification of the invention.

Figure 10 is a sectional view on the line 10—10 of Figure 9, looking in the direction of the arrows, Figure 11 is a sectional view on the line 11—11 of Figure 9, looking in the direction of the arrows, and Figure 12 is a detail sectional view showing the mounting of the signal plate of the modified structure.

In carrying the invention into effect, I employ a base 10 which is provided at its rear side with a handle 11 and formed in the base are, as particularly shown in Figure 2, slots 12 which enter oblong recesses 13 in the rear face of the base. In conjunction with the base I provide a seating block 14 which is, as particularly shown in Figure 4, formed at one side with a curved face and at its opposite side with a flat face to seat the base. In use, it is intended that the device shall be mounted upon the wind shield of a vehicle and I have accordingly shown the device in conjunction with a conventional wind shield 15. As is usual, this wind shield is formed of independently pivoted sections and under present practice the lower section of the wind shield is provided at its rear side with a handle for swinging the section. To apply the present device, this handle is removed when, as shown in Figure 4, the block 14 is positioned against the frame of the wind shield section for supporting the base 10 upon the frame. Bolts 16 are then arranged to extend through the usual handle bolt openings of the frame, through the block and through the slots 12 of the base, the block being provided, as shown in detail in Figure 4ª, with slots 17 to accommodate the bolts. Threaded into the bolts at their inner ends are cap screws 18 rigidly connecting the base as well as said block with the wind shield. The heads of the screws are, of course, freely received in the recesses 13 and closing said recesses are filler plugs 19 of Babbitt or other approved material sealing in the screws so that the base is thus, for all practical purposes, permanently connected with the wind shield. Accordingly, the handle 11 of the device may be grasped for manipulating the lower wind shield section. Since the handles of different makes of motor vehicles vary in length and the openings for the bolts securing said handles thus vary in their spacing, the slots 17 in the block 14 are provided and for a like reason, the base 10 is formed with the slots 12 and elongated recesses 13 so that the device may be readily used in conjunction with practically any conventional automobile. Where a wind shield is formed with a frame having flat faces it will be unnecessary to use the block 14, the base 10 being seated directly against the wind shield frame. However, where a wind shield frame is formed with oval faces, as illustrated in the drawings, the block is used to provide a flat seating face for the base.

The base 10 is preferably stepped for ornamental purposes and mounted upon the base is a metallic casing 20 in which is formed a partition 21, the casing being open at its rear side below the partition and open at opposite sides above the partition. Securing the casing to the base are cap screws 22 extending through the bottom wall of the casing and formed on said wall near the rear side of the casing is an upstanding stop rib 23. Seating at its lower margin against this rib is a closure plate 24 lying flush with the rear edge of the casing and brazed or otherwise permanently secured in position, the joint between the plate and the casing being preferably obscured so that the possibility of access being gained to the interior of the casing will be reduced to a minimum. Closing opposite sides of the casing above the partition 21 are transparent closure panes 25 of glass or other approved material, sight windows being thus provided at the front and rear of the casing, and securing said closure panes in position are stop strips 26.

Formed through the partition 21 of the casing 20 medially of said partition, is a longitudinally extending slot 27, the partition being provided at its upper side with upstanding lips flanking said slot, and formed in the end walls of the casing as well as the top wall thereof to register with said slot are, as particularly shown in Figures 4 and 5, grooves 28 and 29 respectively. Below the partition, the rear side walls of the grooves 28 are, as shown in detail in Figure 6, cut away, and mounted upon the closure plate 24 at its ends to provide such walls below the partition are guide strips 30. Slidable freely in said grooves is a signal plate 31 on opposite sides of which is imposed the word Stop, luminous paint being preferably employed in forming the letters, so that the words will be visible at night. Near its lower margin the plate is, as particularly shown in Figure 3, provided with longitudinally extending slots 32. Suitably secured to the closure plate 24 is an appropriate lock 33 comprising a key operated bolt 34 and formed in said bolt are, as particularly shown in Figure 7, slots 35. Upstanding from the bottom wall of the casing 20 medially thereof, are spaced lugs 36 and pivoted upon said lugs are bell cranks 37 to the short arms of which are fixed pins 38 slidably engaging in the slots 35 of the bolt 34 while upon the long arms of said bell cranks are fixed pins 39 slidably engaging through the slots 32 of the signal plate 31.

As will now be readily understood in view of the preceding description, when the lock 33 is operated for retracting the bolt 34, the short arms of the bell cranks will be swung upwardly while the long arms of said bell cranks will be swung downwardly for lowering the signal plate 31 within the casing so that said signal plate will not be visible through the sight windows of the casing. On the other hand, when the lock is operated for projecting the bolt, as best shown in Figures 3 and 4, the bell cranks will be operated for elevating the signal plate to position lying between the sight windows of the casing. Accordingly, the word Stop will be displayed in each of said sight windows. As suggested in Figure 2, the casing bears a suitable inscription indicating that the occupancy, starting, driving, tampering with or removing of any object from the vehicle is unauthorized when the word Stop is displayed by the device. Thus, the device will serve to deter the unauthorized use of the vehicle as well as molesting of the vehicle, the signal word Stop being, when the signal plate is elevated, readily visible through the wind shield of the vehicle as well as also visible from the rear side of the wind shield.

In Figures 9, 10, 11 and 12 of the drawings, I have illustrated a slight modification of the invention wherein the device is mounted directly upon the wind shield glass. The wind shield glass is indicated at 40 and arranged at the rear side thereof is the signal casing 41. This signal casing is, being mounted upon the wind shield glass, itself preferably formed of glass and is open at its forward side, the forward edges of the casing seat flat against the wind shield glass so that the casing is closed thereby. Overlying the wind shield glass at its forward side is a sign plate 42 registering with the casing and extending through said sign plate and through the end walls of the casing are bolts 43 securing said plate and the casing to the wind shield glass. Threaded into the inner ends of the bolts are cap screws 44 rigidly securing the bolts in place and, as will be observed, the heads of said cap screws are accommodated in recesses 45 in the end walls of the casing. Closing said recesses are filler plugs 46 which serve to lock the screws against displacement.

The casing is provided with a partition 47 therein and this partition is formed with a longitudinally extending slot 48. Registering with this slot are vertical slots 49 in the end walls of the casing while the top wall of the casing is also formed with a similar registering slot 50. Below the partition the forward side walls of the slots 49 are, as shown in detail in Figure 12, cut away in order that the signal plate 51 may be positioned within the casing, this signal plate being adapted to slide in the slots of the casing and secured to the end walls of the casing below the partition 47 are guide strips 52 for said plate. The signal plate 51 corresponds, of course, to the signal plate 31 of the prior embodiment of the invention. Secured to the rear side wall of the casing is an appropriate lock 53 having a bolt 54 and upstanding from the bottom wall of the casing are integral lugs 55 upon which are pivotally mounted bell cranks 56. These bell cranks correspond to the bell cranks 37 previously described and the short arms thereof are provided with pins engaging in suitable slots 54 while the long arms of said bell cranks are provided with pins engaging in suitable slots in the lower margin of the signal plate 51. Thus, the lock 53 may be operated for lowering the signal plate into the casing to inactive position and similarly, may be operated for elevating the plate to project above the partition 47 in active position. Thus, the plate will be visible through the rear side wall of the casing and, as will be observed, the sign plate 42 is provided with an opening 57 so that this plate will also be visible through the wind shield glass 40. The plate 42 carries a warning inscription similar to the inscription upon the casing of the embodiment of the invention previously described so that when the warning signal is displayed by the signal plate the intent of said signal will be clear to all. Above the partition 47 the outer wall of the casing is formed with a clear area providing a sight window through which the signal plate may, when raised, be readily seen while the remaining portion of said wall as well as the other walls of the casing are appropriately rendered translucent so as to prevent view into the casing.

Having thus described the invention, what is claimed as new is:

1. A theft signal for motor vehicles including a casing having a sight window, a signal plate normally obscured within the casing shiftable to a position visible through said window, a lock carried by the casing and having a bolt, and means pivoted within the casing connected at one end to the bolt and at its opposite end to the signal plate forming an operative connection between said bolt and the signal plate whereby the lock may be operated for shifting the plate.

2. A theft signal for motor vehicles including a casing having a sight window, a signal plate normally obscured within the casing shiftable to a position visible through said window, a lock carried by the casing and having a bolt, and a bell crank pivoted within the casing forming an operative connection between said bolt and the signal plate whereby the lock may be operated for shifting the plate.

3. A theft signal for motor vehicles including a casing having a sight window, a signal plate normally obscured within the casing shiftable to a position opposite said window, the plate being formed with a slot, a lock carried by the casing and having a bolt provided with a slot, a bell crank pivoted within the casing, and pins carried by the arms of the bell crank slidably engaging in said slots whereby the lock may be operated for shifting the plate.

4. A theft signal for motor vehicles including a casing having a partition therein and provided above the partition with a sight window, a signal plate within the casing normally disposed below said partition, a lock carried by the casing, and an operative connection between the lock and the plate whereby the lock may be operated for shifting the plate through the partition to a position opposite said sight window.

5. A theft signal for motor vehicles including a casing having a partition therein and open at opposite sides above the partition to provide sight windows, a signal plate within the casing normally disposed below said partition, a lock carried by the casing, and an operative connection between the lock and said plate whereby the lock may be operated for shifting the plate through the partition to a position lying between said sight windows.

6. A theft signal for motor vehicles including a casing having a partition therein and open at opposite sides above the partition, a plate closing the casing below the partition, a signal plate shiftable through the partition to a position between said sight openings, a lock carried by said closure plate and having a bolt, and a bell crank pivoted within the casing forming an operative connection between the bolt and said signal plate whereby the lock may be operated for shifting the signal plate.

In testimony whereof I affix my signature.

LUDWIG R. ZEPKA. [L. S.]